US012288319B2

(12) United States Patent
Kuenzler et al.

(10) Patent No.: US 12,288,319 B2
(45) Date of Patent: *Apr. 29, 2025

(54) COMMISSIONING OF INDOOR POSITIONING SYSTEM AIDED BY AUGMENTED REALITY

(71) Applicant: CURRENT LIGHTING SOLUTIONS, LLC, Beachwood, OH (US)

(72) Inventors: Glenn Howard Kuenzler, East Cleveland, OH (US); Taylor Apolonius Barto, East Cleveland, OH (US)

(73) Assignee: CURRENT LIGHTING SOLUTIONS, LLC, Beachwood, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/595,925

(22) Filed: Mar. 5, 2024

(65) Prior Publication Data

US 2024/0202905 A1 Jun. 20, 2024

Related U.S. Application Data

(63) Continuation of application No. 16/997,054, filed on Aug. 19, 2020, now Pat. No. 11,941,794.
(Continued)

(51) Int. Cl.
*G06K 9/36* (2006.01)
*G01C 21/00* (2006.01)
(Continued)

(52) U.S. Cl.
CPC ........ *G06T 7/0004* (2013.01); *G01C 21/3804* (2020.08); *G01C 21/3811* (2020.08);
(Continued)

(58) Field of Classification Search
CPC . G06T 7/0004; G06T 7/10; G06T 7/11; G06T 7/136; G06T 7/174; G06T 7/194;
(Continued)

(56) References Cited

U.S. PATENT DOCUMENTS 5,999,639 A * 12/1999 Rogers .................. G06T 7/0012
382/156
8,494,218 B2 7/2013 Chen et al.
(Continued)

OTHER PUBLICATIONS

892 Form dated Nov. 24, 2023 which was received in connection with U.S. Appl. No. 16/997,054.
(Continued)

*Primary Examiner* — Eric Rush
(74) *Attorney, Agent, or Firm* — Buckley, Maschoff & Talwalkar LLC

(57) ABSTRACT

System and methods and computer program code are provided to perform a commissioning process comprising capturing, using an image capture device, an image of an area containing at least a first fixture, identifying location and positioning information associated with the image, performing image processing of the image to identify a location of the at least first fixture in the image, and converting the location of the at least first fixture in the image into physical coordinate information associated with the at least first fixture.

12 Claims, 6 Drawing Sheets

Related U.S. Application Data

(60) Provisional application No. 62/889,019, filed on Aug. 19, 2019.

(51) Int. Cl.

| | | |
|---|---|---|
| *G01S 5/00* | (2006.01) | |
| *G01S 17/86* | (2020.01) | |
| *G01S 17/87* | (2020.01) | |
| *G06F 18/25* | (2023.01) | |
| *G06T 7/00* | (2017.01) | |
| *G06T 7/11* | (2017.01) | |
| *G06T 7/136* | (2017.01) | |
| *G06T 7/70* | (2017.01) | |
| *G01S 17/06* | (2006.01) | |

(52) U.S. Cl.
CPC .............. *G01S 5/013* (2020.05); *G01S 17/86* (2020.01); *G01S 17/87* (2013.01); *G06F 18/251* (2023.01); *G06T 7/11* (2017.01); *G06T 7/136* (2017.01); *G06T 7/70* (2017.01); *G01S 17/06* (2013.01); *G06T 2207/20012* (2013.01); *G06T 2207/20212* (2013.01)

(58) Field of Classification Search
CPC .. G06T 7/70; G06T 7/73; G06T 15/50; G06T 15/506; G06T 19/003; G06T 19/006; G06T 19/20; G06T 2207/10004; G06T 2207/10028; G06T 2207/20012; G06T 2207/20212; G06T 2207/20221; H04B 10/116; H04B 10/516; G01S 5/01; G01S 5/013; G01S 5/16; G01S 17/00; G01S 17/02; G01S 17/06; G01S 17/08; G01S 17/42; G01S 17/46; G01S 17/48; G01S 17/86; G01S 17/87; G01S 17/88; G01S 17/89; G01S 17/894; G01C 21/206; G01C 21/3804; G01C 21/3811; G01C 21/383; Y02B 20/40; Y02B 90/20; H05B 47/115; H05B 47/125; H05B 47/155; G06F 18/10; G06F 18/20; G06F 18/25; G06F 18/251

USPC ....... 382/100, 103, 141, 152, 154, 164, 165, 382/170–173, 180, 181, 199, 203, 209, 382/216, 217, 254, 260, 261, 270, 274, 382/275, 282, 291, 325; 348/61, 113, 348/115, 116, 135, 142, 143, 158, 161; 345/419, 619, 629, 632–634; 356/3, 3.01, 356/3.1, 4.01, 5.01, 5.03, 603, 606, 607

See application file for complete search history.

(56) References Cited

U.S. PATENT DOCUMENTS

| | | |
|---|---|---|
| 10,098,204 B1 | 10/2018 | Byers et al. |
| 11,606,222 B2 | 3/2023 | Jessen et al. |
| 2012/0120453 A1 | 5/2012 | Yu et al. |
| 2014/0023335 A1* | 1/2014 | O'Kelley ............... H04N 5/765 386/200 |
| 2015/0098709 A1* | 4/2015 | Breuer ....................... G06T 7/90 398/118 |
| 2015/0163459 A1 | 6/2015 | Jovicic et al. |
| 2017/0061632 A1* | 3/2017 | Lindner ................... G06T 7/50 |
| 2017/0142809 A1* | 5/2017 | Paolini ................... H05B 45/20 |
| 2017/0160371 A1 | 6/2017 | Böckle et al. |
| 2018/0348338 A1 | 12/2018 | Li et al. |
| 2018/0350098 A1* | 12/2018 | Siessegger ................ G06T 7/70 |
| 2019/0101377 A1* | 4/2019 | White ....................... G06T 7/00 |
| 2019/0163989 A1* | 5/2019 | Guo ........................ G06T 7/10 |
| 2019/0188917 A1 | 6/2019 | Cho et al. |
| 2019/0347469 A1* | 11/2019 | Parkkinen ................ G06T 7/73 |
| 2020/0066032 A1* | 2/2020 | Li ........................... G06T 17/05 |
| 2020/0265647 A1* | 8/2020 | Cho ........................ G06T 15/50 |
| 2022/0138971 A1 | 5/2022 | Matsunobu et al. |

OTHER PUBLICATIONS

892 Form dated May 9, 2023 which was received in connection with U.S. Appl. No. 16/997,054.

892 Form dated Oct. 5, 2022 which was received in connection with U.S. Appl. No. 16/997,054.

892 Form dated Dec. 21, 2021 which was received in connection with U.S. Appl. No. 16/997,054.

Notice of Allowance dated Nov. 24, 2023 which was received in connection with U.S. Appl. No. 16/997,054.

* cited by examiner

COMMISSIONING OF INDOOR POSITIONING SYSTEM AIDED BY AUGMENTED REALITY

CROSS-REFERENCE TO RELATED APPLICATIONS

This application is a non-provisional continuation of and claims priority to U.S. patent application Ser. No. 16/997,054, which was filed on Aug. 19, 2020, which is a non-provisional and claims benefit of and priority to U.S. Provisional Patent Application Ser. No. 62/889,019 filed on Aug. 19, 2019, the contents of which are hereby incorporated by reference in their entirety for all purposes.

BACKGROUND

Lighting system installations commonly require that a "commissioning" process be performed in which a number of lighting fixtures in the system are identified and mapped. This allows a lighting control system to control the operation of the lights more effectively. Another benefit of commissioning is that properly commissioned lighting systems can be used in conjunction with indoor positioning (a replacement of Global Positioning Systems that functions indoors, underground, or otherwise out of range of GPS satellites). Commissioning often includes the step of assigning or mapping a position for beacons that can be detected by indoor positioning (IP) software, which software usually runs on a smart device or mobile electronic device. Many recent IP systems seek to exploit the existence of light fixtures that usually are present in an indoor area or space, so that these light fixtures can carry a beacon and/or themselves emit a unique identifier.

Since light fixtures are almost always present in ceiling areas of buildings, garages, and indoor spaces generally, they can form the basis of a ready platform for determining the indoor position of mobile devices. Lighting fixtures, once their location is mapped, can be used as a basis for triangulating or fixing a position of a mobile electronic device. The mobile electronic device detects a unique identifier of the lighting fixtures. The detection of the unique identifier can take many forms, such as a light sensor on the mobile device sensing light modulation (e.g., "flickering") of the lighting fixtures configured to encode a unique ID; or a mobile device detects a radio signal (e.g., Bluetooth) emitting by the fixture (or a beacon in proximity to the fixture) that encodes a unique identifier; or a mobile device detects a unique identifier on or near to a light fixture that is affixed or attached to the fixture, such as a sticker or barcode or light-blocking features, or some other unique appearance given to the fixture.

In order to compute the position of the mobile device (and thereby enable it to provide guidance for its user), the mobile device must be capable of looking up the real-world coordinates of each light fixture's unique ID: and this is done by providing a "map" file to the mobile device. In other words, regardless of the method by which a light fixture is given a unique identifier, and regardless of the method by which a mobile device detects the unique ID, most IP systems nevertheless require the predicate step of mapping: determining the {x, y, z} spatial positions of each of the light fixtures in a given space to create a "map", where each fixture has a unique identity code.

The present disclosure is not limited to the manner in which the unique ID is affixed to a fixture or light source, or how the unique ID is detected.

Existing methods of mapping fixtures may involve rather time-consuming measuring technologies involving one or more of: lasers, lidar, measuring tapes, sonar, blueprints, etc., along with significant manual effort and analysis of the collected data.

It would be desirable to provide systems and methods for more efficient mapping of lighting fixtures.

SUMMARY OF THE INVENTION

According to some embodiments, systems, methods, apparatus, computer program code and means are provided to perform a commissioning process which comprise capturing, using an image capture device, an image of an area containing at least a first fixture, identifying location and positioning information associated with the image, performing image processing of the image to identify a location of the at least first fixture in the image, and converting the location of the at least first fixture in the image into physical coordinate information associated with the at least first fixture.

In some embodiments, the identifying location and positioning information associated with the image is performed using an augmented reality application that identifies a location of the at least first fixture in relation to an anchor point. In general, an augmented reality application is an application that superimposes digital images or data on the physical world. Embodiments use augmented reality to allow efficient mapping of lighting fixtures in an installation. In some embodiments, the image capture device is a camera of a mobile device. In some embodiments, the performing image processing of the image further comprises performing at least a first thresholding operation to produce a modified image having pixels of a first value that represent the light fixture and determining a centroid of the light fixture.

Some technical effects of some embodiments of the invention are improved and computerized ways to automatically identify lighting fixtures in an environment without need time consuming and error prone human measurements and calculations. With these and other advantages and features that will become hereinafter apparent, a more complete understanding of the nature of the invention can be obtained by referring to the following detailed description and to the drawings appended hereto.

DETAILED DESCRIPTION

Figure 1:
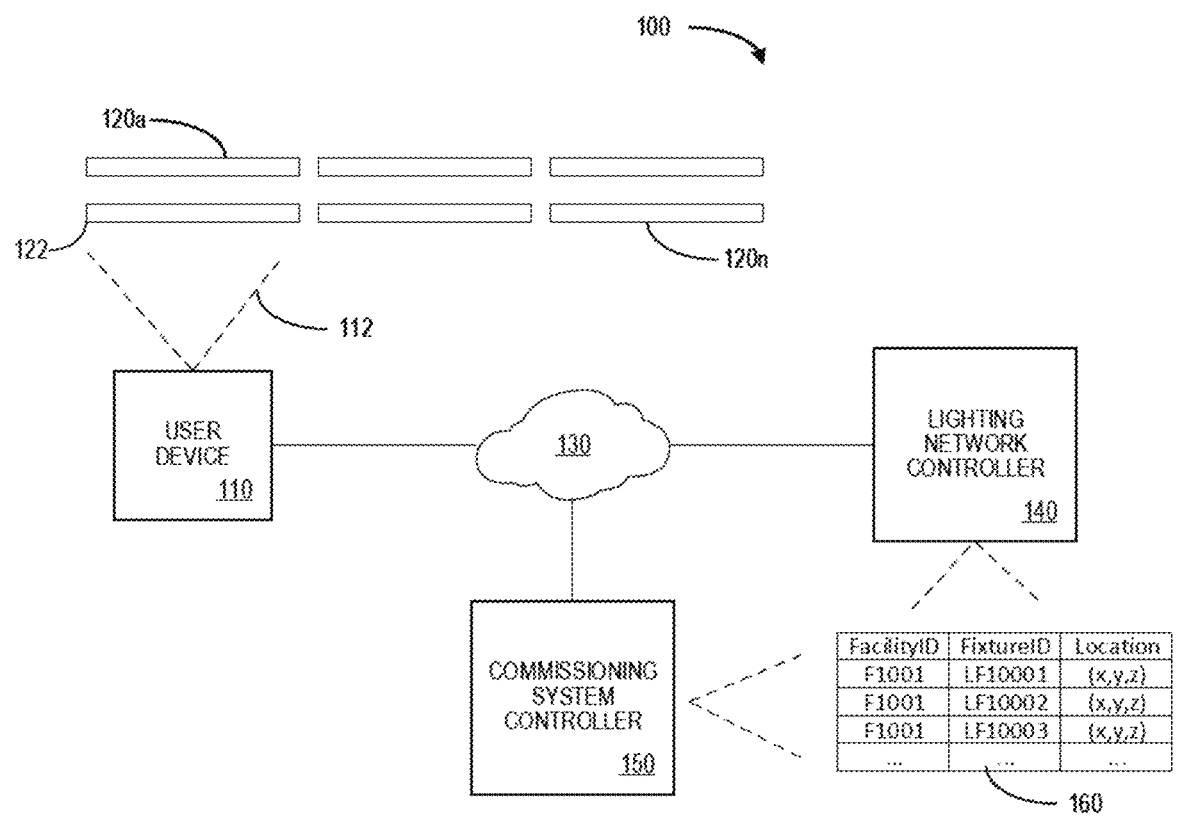
FIG. 1 is a high-level block diagram of a system according to some embodiments.

In the following description, specific details are set forth in order to provide a thorough understanding of the various example embodiments. It should be appreciated that, upon reading the present disclosure, various modifications to the embodiments will become readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

The example embodiments are directed to systems, methods and computer program code which can be used to commission a lighting control network using a mobile device configured to capture images of a lighting environment and to convert information associated with the lighting environment into a set of map data identifying the position of individual lighting fixtures in the environment. The resulting map data may then be used for a number of purposes, including, for example, for configuring a lighting control network (to control and monitor individual ones or groups of the fixtures) as well as for use with indoor positioning systems. The result is an ability to efficiently and accurately create map data for an installation of fixtures without the substantial manual measuring and tagging work required by previous approaches.

For convenience and ease of exposition, a number of terms are used herein. For example, the term "commissioning" generally refers to a process of identifying lighting fixtures in an installation and configuring them for operation under control of a lighting control system. Part of the "commissioning" procedure is the creation of mapping information identifying the locations of each fixture. As used herein, the term "commissioning" may refer to either the whole process (of mapping as well as configuring fixtures) as well as to the mapping portion of the process. Further, while the techniques described herein are particularly beneficial in lighting control system commissioning applications, they may also be used in other similar commissioning processes where the creation of mapping data is required.

As used herein, a "mobile device" may be a portable device that can be transported and be operated by a user, and may include one or more electronic components (e.g., an integrated chip, etc.). A mobile device according to some embodiments may be in any suitable form including, but not limited to a mobile phone (e.g., smart phone, cellular phone, etc.), a tablet computer, a portable media player, a personal digital assistant device (PDA), a wearable communication device, an electronic reader device, a laptop, a netbook, an ultrabook, etc.

FIG. 1 is a high-level block diagram of a commissioning system 100 according to some embodiments of the present invention. As shown, the commissioning system 100 includes several entities that may be involved in a commissioning process pursuant to the present invention, including a user device 110 a network 130, a lighting network controller 140 and an optional commissioning system controller 150. As shown, the commissioning system 100 is being used to commission a set of lighting fixtures 120a-n at a location (e.g., such as a room or group of rooms in a facility in which a lighting network controller 140 is being configured for operation). As discussed above, part of a commissioning process may be a mapping process in which map data 160 is generated identifying the locations of lighting fixtures 120a-n in the lighting installation. Pursuant to some embodiments, only a single user device 110 may be required to generate the map data 160. The map data 160 may then be transmitted to the lighting network controller 140 and/or a commissioning system controller 150 for use. In some embodiments, multiple user devices 110 may be operated cooperatively to generate the map data 160. In some embodiments, the lighting network controller 140 and/or the commissioning system controller 150 may participate in or support the mapping process.

As an illustrative but not limiting example, the lighting fixtures 120a-n may be industrial suspended LED fixtures installed to hang below a ceiling in a warehouse or large retail store. Each lighting fixture 120a-n may have a bar code, tag or other indicator (not shown in FIG. 1) used to identify the particular lighting fixture 120a-n. The lighting network controller 140 may be, for example, a Daintree® lighting network controller or the like, and some or all of the fixtures may possess the ability to communicate with the lighting network controller 140. Such communication may be enabled by the presence of one or more radio transmitter (e.g., a Bluetooth radio that emits a unique address, or a mesh network node, or the like) that exists in association with each lighting fixture 120a-n. In some embodiments, to facilitate identification of each lighting fixture 120a-n with a unique identifier, the fixture may contain a visible unique identifier such as a colored sticker, a pattern of dots, a barcode, or a pattern of other light-obscuring objects that together identify the lighting fixture 120a-n when interpreted.

The commissioning system controller 150 may be a server or servers that allow users operating user devices 110 to obtain or download software applications configured to operate pursuant to the present invention. The commissioning system controller 150 may also provide services on behalf of the user devices 110 to perform some processes of the present invention as will be discussed further herein.

Embodiments of the present invention allow a user to operate a user device 110 to generate map data of the lighting fixtures 120a-n simply by pointing a camera or image capture device of the user device 110 at the lighting fixtures 120a-n to capture an image of a target area 112 of the fixtures. Pursuant to some embodiments, the user device 110 operates application software as described further herein which analyzes data captured by a camera to obtain location data as well as to identify lighting fixtures 120a-n in the image. The user device 110 operates to prompt the user to move about the facility to capture information about each of the lighting fixtures 120a-n. The user device 110 (alone or in conjunction with processing provided by the commissioning system controller 150 and/or the lighting network controller 140) produces a set of map data identifying the positions of each of the lighting fixtures 120a-n. The resulting set of map data may be stored at, or accessible to, the lighting network controller 140 for use in completing the commissioning of a lighting network that includes the lighting fixtures 120a-n. The map data may also be stored at, or accessible to, the commissioning system controller 150 for use in providing indoor positioning services. An illustrative map data store 160 is shown as including data identifying the facility in which the lighting map was created, as well as a fixture identifier identifying the specific fixture as well as location information expressed, for example, using a coordinate system that may be based on a known origin point 122 in the installation. While only a single set of coordinates are shown for each fixture in map data store 160, in some embodiments, the map data store 160 may include one or more coordinates and vectors indicating an orientation for each lighting fixture 120a-n.

Pursuant to some embodiments, the user device 110 is configured to perform processing pursuant to the present invention using one or more software applications stored on the user device 110. For example, the user device 110 may be an Apple iPhone®, and the device may be configured to operate a software application that is provided by an operator of a system of the present invention. The software application causes the user device 110 to perform processing as described further herein. Pursuant to some embodiments, the software application may include or interact with an augmented reality application such as the ARKit® software provided by Apple, Inc., the ARCore® from Google Inc., or the Microsoft Mixed Reality Toolkit® provided by Microsoft Corp. Further, pursuant to some embodiments, the software application may include or interact with an image processing application such as the OpenCV application available from www.opencv.org or the like. Those skilled in the art, upon reading the present disclosure, will appreciate that other image processing and augmented reality applications may be used so long as the functionality described further below are provided. In some embodiments, the software application, the augmented reality application and the image processing application all run on the user device 110 and produce the resulting map data. In some embodiments, the user device 110 may interact with a remote device such as the commissioning system controller 150 to perform the processing (e.g., the commissioning system controller 150 may perform one or more functions of the augmented reality application and/or the image processing application using data and images provided by the user device 110). For example, in some embodiments, augmented reality software may execute on the commissioning system controller 150, at both the system controller 150 and the user device 110, or at the user device 110.

Embodiments of the present invention allow a user operating a user device 110 to direct a camera of the user device 110 towards a target area 112 containing fixtures of interest. The augmented reality ("AR") application on the user device 110 reads camera data from the camera as well as sensor data from inertial sensors of the device 110. The AR application uses the data to generate a three-dimensional model representing the target area 112. Image data is then processed using the image processing application on the user device 110 to identify the lighting fixtures within the images and to identify a center point (or other reference point) of each of the identified fixtures. The identified lighting fixtures are then mapped to real world coordinates. The user device 110 may further be operated to prompt the user to capture additional images to improve the accuracy of the mapping of the fixtures. The user may simply initiate the application of the present invention and point the camera of the user device 110 towards the ceiling and move through the space to capture location information about all of the fixtures in a room or installation. Pursuant to some embodiments, this mapping approach substantially reduces the manual effort required to measure and layout a map using conventional techniques.

Although the system depicted in FIG. 1 (and elsewhere throughout this disclosure) shows only a single user device 110, lighting network controller 140 and commissioning system controller 150, those skilled in the art will appreciate that in use there will be a number of user devices in use at a number of locations having one or more lighting network controllers and interacting with one or more commissioning system controllers. Further, in some embodiments, in mapping at a single location, multiple user devices 110 may be operated cooperatively to more quickly generate map data pursuant to the present invention.

User devices 110 according some embodiments can be configured to communicate with external entities (such as lighting network controller 140, commissioning system controller 150 or the like) through communications technologies and protocols such as cellular communication and Internet protocols (represented by network 130 in FIG. 1). They may also be configured to communicate with other devices (such as other user devices 110) using any suitable short or medium range communications technology including Bluetooth (classic and BLE—Bluetooth low energy), NFC (near field communications), IR (infrared), Wi-Fi, etc.

Some or all of the processing described herein may be performed automatically or otherwise be automated by one or more computing devices or systems. As used herein, the term "automate" may refer to, for example, actions that can be performed with little (or no) intervention by a human.

Figure 2:
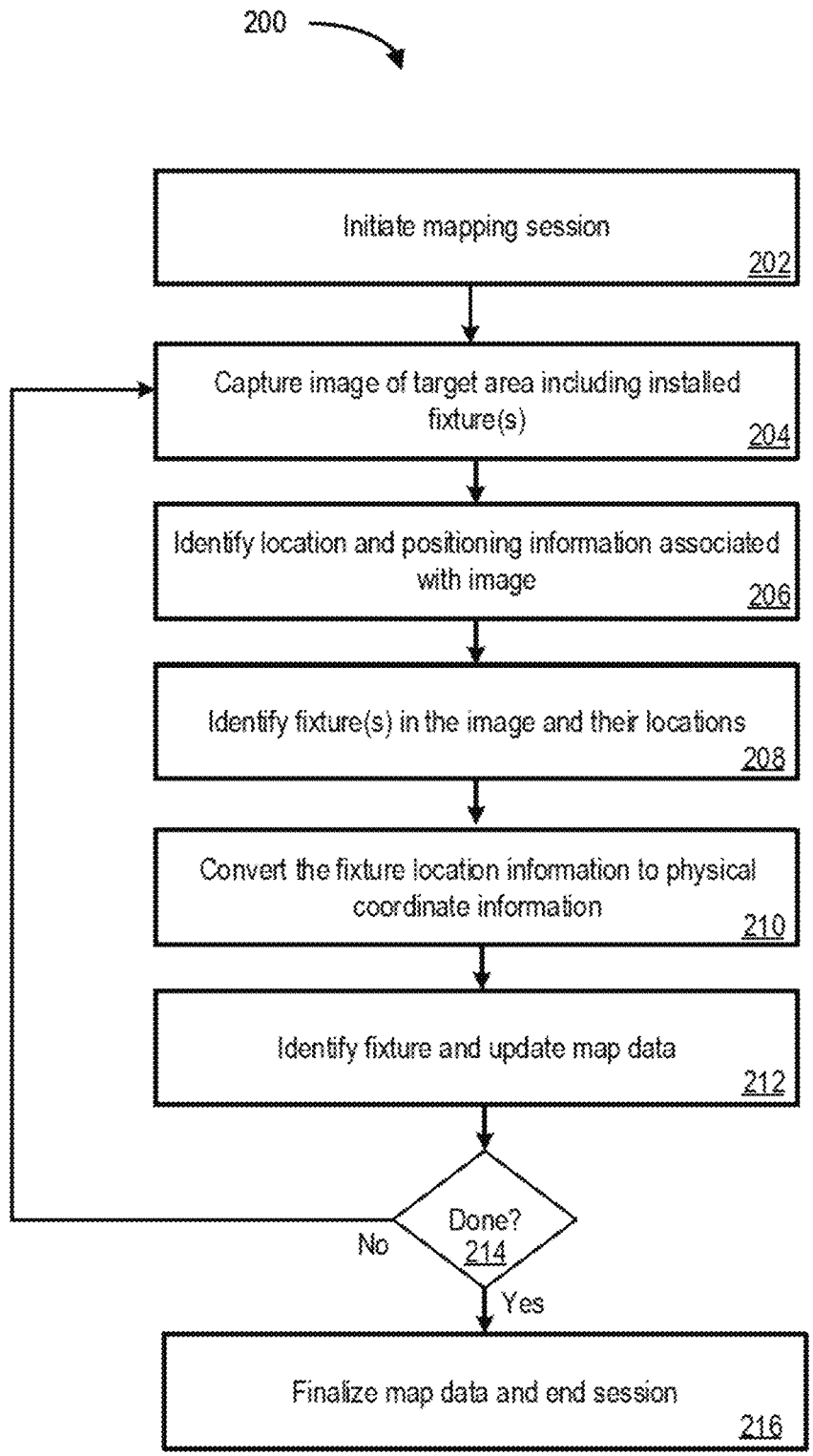
FIG. 2 is a flow diagram depicting a mapping process according to some embodiments.

Details of a mapping process 200 pursuant to some embodiments will now be provided by reference to FIG. 2. The process 200 may be performed by a device such as user device 110 of FIG. 1 operating on its own or in conjunction with other user devices 110, commissioning system controllers 150 and/or lighting network controllers 140. In general, the mapping process 200 may be performed when a lighting fixture is installed or modified at a location.

Mapping process 200 may begin at 202 where a user operating a user device 110 initiates the mapping process by, for example, launching a mapping application on the user device 110. The mapping application will require the user to provide information about the location to initiate the mapping process or it may be pre-configured with information about the location (such as the location name, information about the types of fixtures at the location, etc.). The initiation of the mapping process may also cause the initiation of a session (such as an ARKit session) which will ensure that the images captured during the session are placed in a similar coordinate system. The mapping process 200 will be described by also referring to FIGS. 3 and 4 to illustrate examples of the results of certain steps of process 200. FIG. 5 will also be referenced to illustrate an example user interface that may be presented during process 200.

In some embodiments, the user is prompted to start at a specific location or find a specific fixture to serve as the origin or anchor point 122. The use of a specific location or fixture allows the origin to be calibrated to an absolute location within the building or installation area. For simplicity, the origin or anchor point 122 will be described herein as being part of a lighting fixture 120a-n, however, the anchor point 122 may be any known location that allows the origin to be calibrated to the absolute location in the facility. The user may direct the camera at a specific fixture or area and the application may operate to identify a feature of interest on a specific fixture or area as the anchor point 122 (e.g., such as a reflective strip, a specific shape, a picture, a pattern, or the like). In some embodiments, the user may select a point or specific fixture as the origin by interacting with an input device of the user device 110 (e.g., by pointing the camera of the user device 110 at a specific fixture and selecting a corner of that fixture as the origin). The augmented reality application provides a capability for tracking movement of the user device 110 using a visual inertial odometer, and using the anchor point 122 as location (0, 0, 0) (the initial x, y, z coordinates of the session) in 3D space the application can locate anything in the camera field of view in relation to the anchor point 122. The coordinates in the augmented reality application may be referred to as the coordinates in the application's world-coordinates system.

Figures 3A, 3B, 3C:
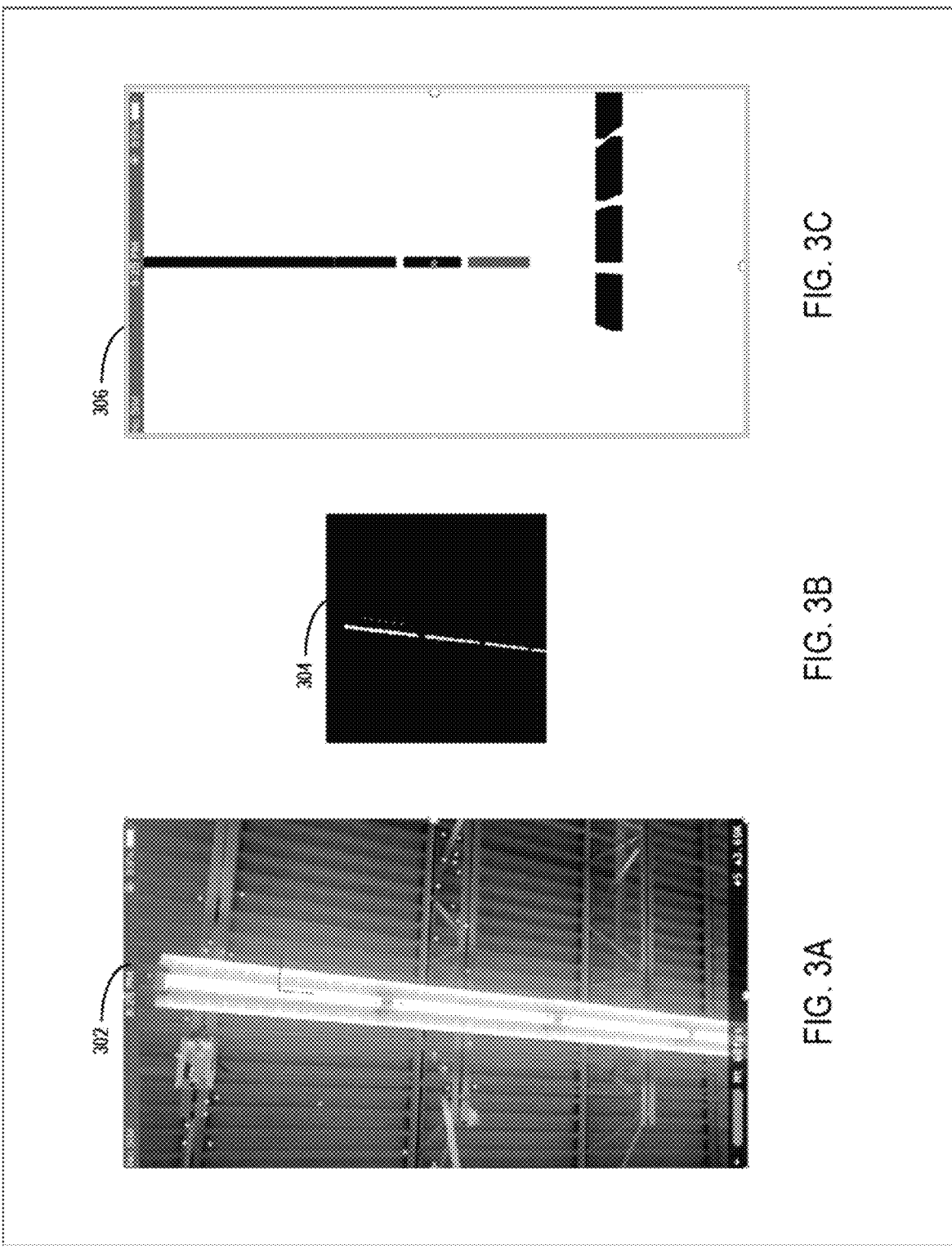
FIG. 3 is a diagram depicting a series of images of a light fixture imaging process according to some embodiments.
Figure 4A:
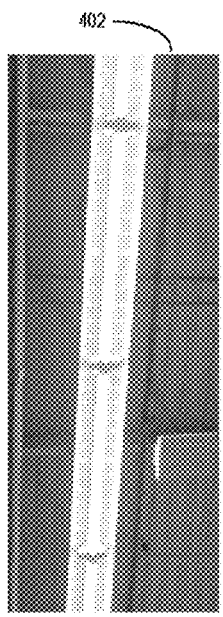
FIG. 4 is a diagram depicting a series of images of a light fixture imaging process according to some embodiments.
Figure 4B:
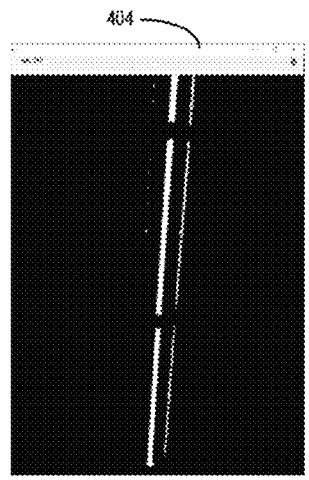

Processing continues at 204 where the user is prompted to point a camera or other image capture device of the user device 110 at an area containing one or more lighting fixtures 120a-n in the installation. At this point, the mapping application as well as the augmented reality application are running and a session has been initiated. As the user directs the camera of the user device 110 at an area, the augmented reality application displays the generated augmented reality scene to the user on a display device of the user device 110 (e.g., as shown in FIG. 5). An illustrative example will be described by referring to FIGS. 3 and 4. Referring first to FIG. 3A, an example display of a user device 110 is shown which shows what a user operating a user device 110 pursuant to the present invention may see when the camera of the device is pointed at a ceiling of a building having lighting fixtures to be mapped. As shown, the display is displaying an augmented reality view 302 of a lighting fixture. In some embodiments, a user device 110 may have multiple cameras (e.g., such as one or more front facing cameras and one or more rear facing cameras). In some embodiments, the multiple camera views may be used to capture additional augmented reality scenes and images (e.g., such as to generate an augmented reality view(s) of both the floor as well as a ceiling). Further, in some embodiments, a user device 110 may support mixing to improve the mapping between the user device 110 and the real world.

Processing at 204 includes obtaining a frame or image of the augmented reality scene. The frame or image may be automatically captured by the application when the camera is pointed at a fixture or in the direction of a group of fixtures. In some embodiments, the frame or image may be captured based on some action taken by a user (e.g., when the user selects an image capture button using an input device of the user device 110). In an embodiment using ARKit, the frame may be captured using an ARKit callback. As an example, an image such as the image 302 of FIG. 3A may be captured.

Processing continues at 206 where the application functions to identify the location and positioning information associated with the camera of the user device 110. For example, the application computes the physical position and orientation of the camera relative to the real-world origin or anchor point 122.

Processing continues at 208 where the frame or image is processed using a computer vision application or module (such as OpenCV and generally referred to herein as "image processing") to identify any fixture(s) and their locations within in the image. For example, the image processing may result in an image 304 such as that shown in FIG. 3B. In one illustrative embodiment, the image processing application uses the light intensity of the light fixtures to identify the fixtures in the image 302. In some embodiments, the image processing may be programmed to reject spurious false positives for light fixtures (such as skylights or reflected images).

Once one or more fixture(s) have been identified in an image, the image processing application may be operated to identify location information associated with the fixture. For example, in some embodiments, the image processing application identifies a centroid of the fixture as well as a vector which indicates the orientation of the fixture. The coordinates of the centroid and the vector are stored, and as will be discussed further herein, a number of attempts of identifying the centroid of each fixture may be made by repeating the processing of 204-210 a number of times until the centroid of each fixture is identified with some level of statistical confidence. In some embodiments, the identification of a centroid of a fixture may require some user input to select or identify a fixture of interest. In some embodiments, the identification of the fixture and the centroid are performed automatically and substantially without human intervention. In some embodiments, other points from the fixture are identified in addition to or instead of the centroid.

In some embodiments, it may be desirable to manipulate the exposure of an image or frame prior to performing image processing at 208. For example, in embodiments where a fixture identifier is obtained using image processing techniques, the exposure needed to accurately capture an identifier may be different than the exposure needed to identify a lighting fixture. For example, in some embodiments, the augmented reality application processing may be paused while an image processing application performs some exposure control and processing to allow the application to read an identification of the fixture (e.g., a bar code reading application may be used to read a bar code that encodes an identifier of a fixture). In an installation where reflections from the lighting fixtures may be present, the exposure may require further adjustment to identify a desirable image exposure. In some embodiments, an exposure and application tuning process may be performed before the mapping process 200 to ensure the greatest accuracy of results. For example, if the augmented reality application does not control or normalize the exposure of images, then a given fixture may appear as overexposed (and thus difficult to accurately analyze using image processing techniques) when the image is presented to the image processing application. By normalizing the exposure in the augmented reality application (or by toggling between the augmented reality application and an image processing application that allows exposure control), the images may be provided with a standard level of brightness regardless of the angle and intensity in the augmented reality application. In some embodiment, high dynamic range technology may also be used to capture multiple images at multiple exposure levels and to then integrate those into a single image suitable for processing both the fixture and the room characteristics.

In some embodiments, a fixture may be identified using thresholding techniques provided by OpenCV. Thresholding is an image segmentation method that converts a gray-scale image into a binary image where the two levels are assigned to pixels that are below or above a specified threshold value. For example, referring to FIG. 4A, a captured frame or image 402 from ARKit is shown. In FIG. 4B, the image 402 has been processed using image processing software such as OpenCV using a global thresholding method to produce an image 404. The image 404 is comprised of pixels having one of two values—black or white. In the image 404, a global threshold value was used (such that pixels exceeding that value are shown as white, and pixels below that global threshold are shown as black).

Figure 4C:
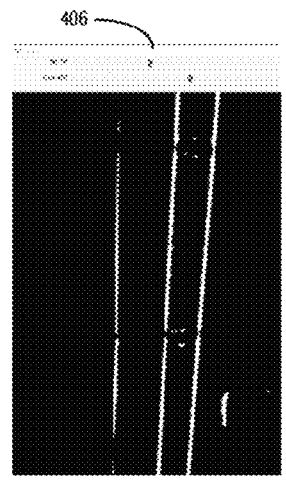
Figure 5:
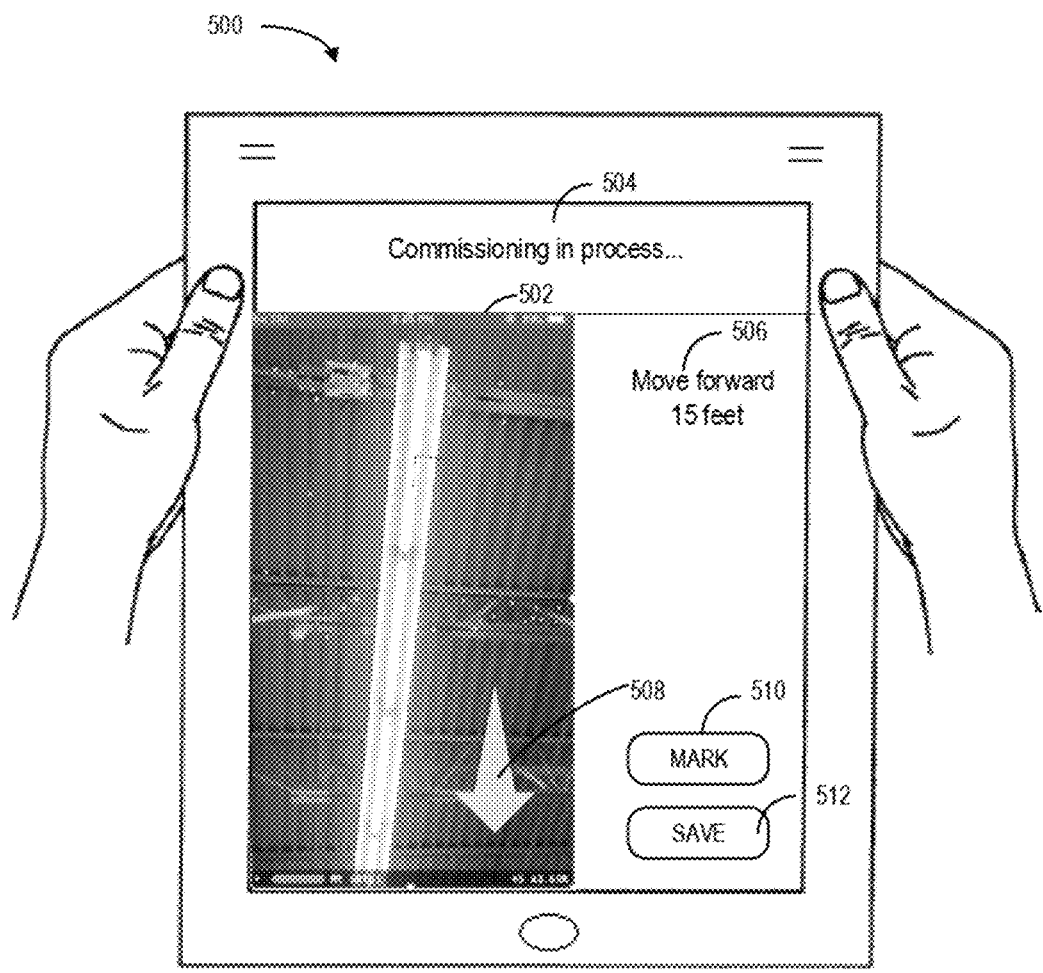
FIG. 5 is a diagram depicting an illustrative user interface that may be used according to some embodiments.

In FIG. 4C, the image 402 has been processed using a local thresholding method to produce an image 406. In the local thresholding or adaptive method, the threshold value is based on information associated with a neighboring area of pixels. As shown, image 406 captures different features of the lighting fixture than image 404.

Figure 4D:
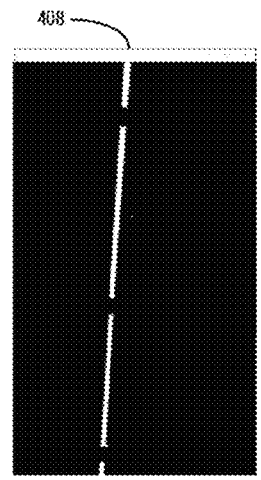

In FIG. 4D, the two images 404 and 406 are pixel-by-pixel processed using an AND function. The resulting image is then further processed using an exclusive OR function with image 404 to produce a final image 408. As shown, the final image 408 more clearly and accurately depicts the lighting fixture from the input frame or image 402. Further pixel operations may then be performed to identify a centroid of each fixture.

Whichever image processing approach is used to identify the fixtures in the input frame or image, processing at 208 further includes identifying the location coordinates of the fixture in the image. The location of the fixture in the image analyzed by the image processing application may be in a different coordinate system than the world-coordinate system of the augmented reality application and, as a result, a conversion from the image coordinates to the world-coordinate system of the augmented reality application may be required.

Processing continues at 210 where the fixture location information is converted to physical coordinate information. For example, in embodiments using the ARKit application, processing at 210 may include invoking the corelocation method of ARKit to convert the information about the fixture coordinates into real-world coordinates. For example, this may include appending distance information to the coordinates of the anchor point 122 or origin of the scene in the mapping session. For example, if the center of the fixture being processed at 210 is 10 meters in the y-direction from the anchor point 122 or origin of the mapping session, the map coordinate data for the fixture will be set to reflect that distance.

Processing continues at 212 where the map data information is updated with information about the identified fixture including information about the location of the fixture. This may include converting the location information from the world-coordinate system into real world coordinates. These transformations of coordinate systems may be understood by reference to FIG. 3. In FIG. 3A, a first image 302 is shown which is an image as captured and displayed to the user on a display device of user device 110 using the augmented reality application (such as ARKit). The coordinate system of the image 302 is the camera coordinate system of the user device 110. Then, when the image is processed using the image processing application (such as OpenCV), an image 304 such as shown in FIG. 3B is generated that depicts the lighting fixture in the coordinate system of the image processing application. The images may further be transformed into world coordinates as depicted in FIG. 3C, where a birds eye view image 306 of the lighting fixture is shown which is a top view representation of the ceiling that has been mapped (where the coordinates are real world coordinates that identify the location of each lighting fixture with respect to a reference point such as origin 122 of FIG. 1) The real world coordinates may be used in the commissioning system as well as in any indoor positioning systems and applications. In some embodiments, the augmented reality application projects the coordinates of each identified fixture (in the camera coordinate system) until it intersects with a horizontal plane detected in world coordinates (e.g., using the ARKit hit test method). The intersection where the projected point and the horizontal plane meet provides an (x, y, z) location of the center of the light fixture 120.

Processing continues at 214 where a determination is made whether the mapping process is complete or not. For example, processing at 214 may include determining if all of the fixtures in an installation or area have been identified and mapped. This determination may include comparing a count of the identified fixtures with a stored count of fixtures in an installation or area, or by prompting the user to determine if all fixtures have been mapped. In some embodiments, processing at 214 may further include determining whether all fixtures have been accurately mapped. For example, in some embodiments, the application may statistically analyze the values for position of each fixture to determine whether the mean coordinates for each fixture in the map data are physically reasonable. If a fixture has a standard deviation of its spatial measurements that are unacceptably large, the fixture may be flagged as requiring additional measurements.

For example, in some embodiments, the application may prompt the user to make multiple passes through a fixture installation, causing the user to point the user device 110 at each fixture multiple times. The mapping data may be analyzed for each fixture to determine a confidence level that the location of each fixture has been accurately determined. If a particular fixture has not been accurately located (for example, each attempt at determining the location of the fixture results in inconsistent location data), the application may require that the user continue the mapping process and processing may continue at 204. If processing at 214 determines that the mapping process is complete and each fixture in an area or installation has been located and identified, processing continues at 216 and the mapping data set is finalized and stored for use in completing a commissioning process and/or for performing indoor positioning servicing.

If processing determines that mapping is not complete, and processing continues at 204, the application may prompt the user on a display of the user device 110 of what next actions to take. For example, referring to FIG. 5, the user may be prompted to move in a certain direction to capture additional images or views of the lighting fixtures.

In some embodiments, due to the delay in processing images, the user device 110 may have moved between the time that the augmented reality application has captured a view of a fixture and the time that the image processing has completed. This can make it difficult to map the results of the image processing back to augmented reality coordinate system. To account for this movement, pursuant to some embodiments, a correction step may be implemented to reference where the camera originally was at the moment of image acquisition of a given fixture rather than where the camera is located at the moment that image processing was completed. As a more specific example, the movement may be accounted for by application of the following transform: $[Camera_{t0}]^{-1}[Camera_{t1}][detected\ point]$, where $Camera_{t0}$ is the camera transform before image processing has occurred, $Camera_{t1}$ is the camera transform after image processing is performed, and detected point is a point in space determined by, for example, an ARKit hit test. In this manner, embodiments account for the movement of the user device 110 while processing occurs making a more natural process for a user of the user device 110.

Figure 6:
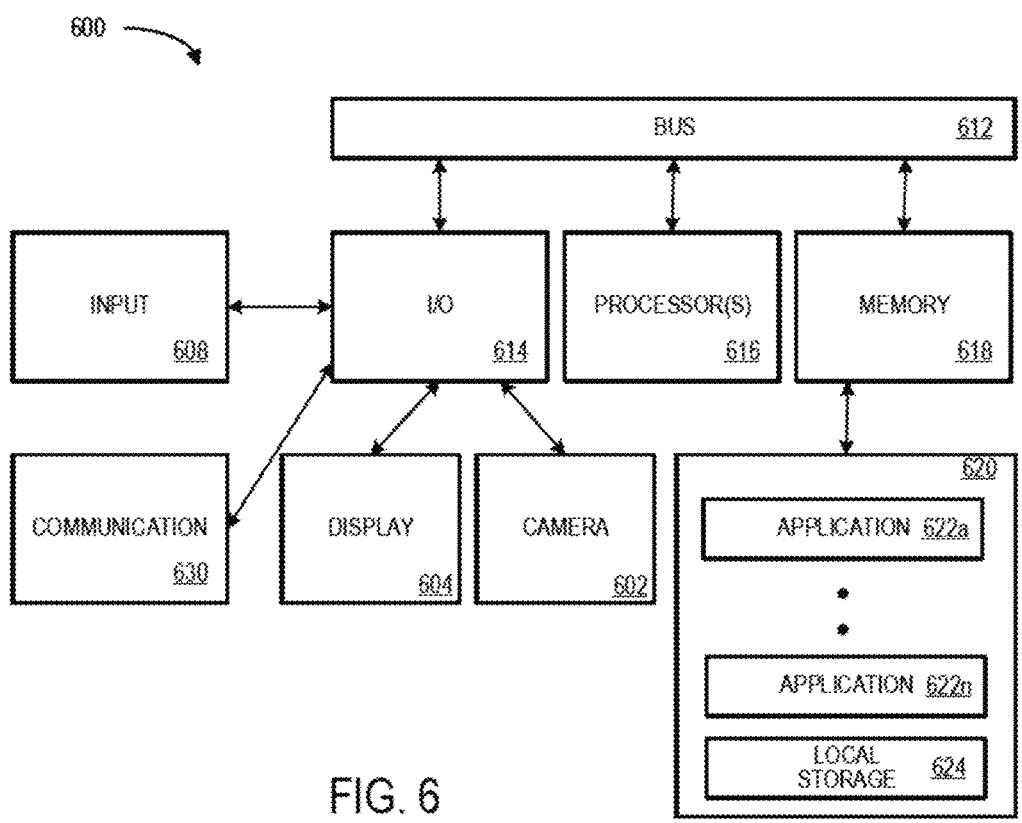
FIG. 6 is a block diagram of an apparatus in accordance with some embodiments of the present invention.

The embodiments described herein may be implemented using any number of different hardware configurations. FIG. 6 illustrates a mobile device 600 that may be used in any of the methods and processes described herein, in accordance with an example embodiment. For example, the mobile device 600 may be operated as the user device 110 of FIG. 1.

In some embodiments, mobile device 600 can include some or all of the components described with respect to FIGS. 1-3. Device 600 has a bus 612 or other electrical components that operatively couple an input/output ("I/O") section 614 with one or more computer processors 616 and memory section 618. I/O section 614 can be connected to a display 604, which can have one or more aspects such as a touch-sensitive component (not shown) as well as a camera 602. The camera 602 can be a still or video camera or a combination thereof so long as it is capable of capturing still or video images of a target area such as target area 112 of FIG. 1.

In addition, I/O section 614 can be connected with communication unit 630 for receiving application and operating system data, using Wi-Fi, Bluetooth, near field communication (NFC), cellular, and/or other wireless communication techniques (e.g., to allow the mobile device 600 to interact with lighting network controller 140 and commissioning system controller 150). Mobile device 600 can include one or more input mechanisms 608 such as a keypad, a button, a touch-screen display, or the like.

Input mechanism 608 may also include a microphone. Mobile device 600 also preferably includes a camera various sensors (not shown), such as a GPS sensor, accelerometer, directional sensor (e.g., compass), gyroscope, motion sensor, and/or a combination thereof, all of which can be operatively connected to I/O section 614. These sensors operate to provide positional information used to generate the mapping data as described herein.

Memory section 618 of mobile device 600 can include one or more non-transitory computer-readable storage mediums, for storing computer-executable instructions, which, when executed by one or more computer processors 616, for example, can cause the computer processors to perform the techniques described herein, including process 200. A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Mobile device 600 is not limited to the components and configuration of FIG. 6 but can include other or additional components in multiple configurations.

Memory section 618 may store one or more applications 622a-n including, for example, an augmented reality application (such as ARKit), an image processing application (such as OpenCV) and a mapping application as described herein. Memory section 618 may also provide local storage for the storage of map data generated by the processing of the applications.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

For example, while image processing techniques to identify the fixtures in an image have been described, other approaches may also be used. For example, in some embodiments, the image processing techniques described herein may be replaced or augmented with computer vision machine learning models that are trained to perform object detection. For example, a machine learning model may be trained to identify specific types of lighting fixtures. The machine learning model may then be used in lieu of the processing at 208. In some embodiments, such object detection techniques may be performed in conjunction with the augmented reality processing at 204 (thereby eliminating the need to perform separate steps of image processing or object detection after the augmented reality processing).

What is claimed:

1. A method, comprising:
   capturing, using an image capture device of a user device, an image of an area containing at least a first fixture;
   identifying physical location and positioning information associated with the image capture device;
   mapping, using LiDAR mixed with the identified physical location and positioning information associated with the image capture device, physical location and positioning information for the at least first fixture, wherein the LiDAR is supported by the user device;
   identifying pixel coordinates in the image of the at least first fixture in the image by performing image processing of the image including a first thresholding process and a second thresholding process, wherein the first thresholding process generates a first thresholding process image including a plurality of pixels and the second thresholding process generates a second thresholding process image;

pixel-by-pixel processing the first thresholding process image and the second thresholding process image to generate a third image;

generating a final image by processing, using an OR function, the third image and the first thresholding process image;

and converting pixel coordinates of the at least first fixture in the final image into physical coordinate information associated with the at least first fixture.

2. The method of claim 1, wherein the identifying physical location and positioning information associated with the image capture device is performed using an augmented reality application that identifies a physical location of the at least first fixture in relation to an anchor point.

3. The method of claim 2, wherein the image capture device is a camera of a mobile device.

4. The method of claim 1, wherein the performing image processing of the image further comprises:

performing at least a first operation to produce a modified image having pixels of a first value that represent the at least first fixture; and determining a reference point and orientation vector of the at least first fixture.

5. The method of claim 1, further comprising:

prior to performing image processing of the image, normalizing an exposure of the image.

6. The method of claim 1, wherein the capturing and performing image processing are performed at different times, the method further comprising:

adjusting the physical coordinate information to account for movement of the image capture device during processing.

7. The method of claim 1, further comprising:

storing the physical coordinate information in a map table associated with a lighting installation.

8. The method of claim 7, further comprising:

storing an identifier of the at least first fixture in the map table.

9. The method of claim 1, further comprising:

generating a display on a display device prompting a user of the image capture device to perform a further image capture operation.

10. A non-transitory, computer-readable medium storing instructions, that, when executed by a processor, cause the processor to perform a mapping method comprising:

capturing, using an image capture device of a user, an image of an area containing at least a first fixture;

identifying physical location and positioning information associated with the image capture device;

mapping, using LiDAR mixed with the identified physical location and positioning information associated with the image capture device, physical location and positioning information for the at least first fixture, wherein the LiDAR is supported by the user device;

identifying pixel coordinates in the image of the at least first fixture in the image by performing image processing of the image including a first thresholding process and a second thresholding process, wherein the first thresholding process generates a first thresholding process image including a plurality of pixels and the second thresholding process generates a second thresholding process image;

pixel-by-pixel processing the first thresholding process image and the second thresholding process image to generate a third image;

generating a final image by processing, using an OR function, the third image and the first thresholding process image;

and converting pixel coordinates of the at least first fixture in the final image into physical coordinate information associated with the at least first fixture.

11. The non-transitory, computer-readable medium of claim 10, wherein the identifying physical location and positioning information associated with the image capture device is performed using an augmented reality application that identifies a location of the at least first fixture in relation to an anchor point.

12. The non-transitory, computer-readable medium of claim 10, wherein the performing image processing of the image further comprises:

performing at least a first operation to produce a modified image having pixels of a first value that represent the at least first fixture; and determining a reference point and orientation vector of the at least first fixture.

* * * * *